United States Patent
Endo

(10) Patent No.: US 8,325,813 B2
(45) Date of Patent: Dec. 4, 2012

(54) MOVING IMAGE CODING APPARATUS

(75) Inventor: Hiroaki Endo, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 835 days.

(21) Appl. No.: 12/209,464

(22) Filed: Sep. 12, 2008

(65) Prior Publication Data

US 2009/0074072 A1 Mar. 19, 2009

(30) Foreign Application Priority Data

Sep. 14, 2007 (JP) ................................. 2007-238713

(51) Int. Cl.
*H04N 7/12* (2006.01)
(52) U.S. Cl. .......... 375/240.16; 375/240.15; 375/240.24
(58) Field of Classification Search ............... 375/240.1, 375/240.16, 240.24, 240.26
See application file for complete search history.

(56) References Cited

U.S. PATENT DOCUMENTS

| 6,125,432 A | 9/2000 | Hanami et al. |
| 6,631,364 B1 * | 10/2003 | Rioux et al. ........................... 1/1 |
| 2007/0047649 A1 * | 3/2007 | Suzuki et al. ............ 375/240.15 |
| 2007/0064808 A1 * | 3/2007 | Ishii et al. ................ 375/240.16 |

FOREIGN PATENT DOCUMENTS

| JP | 8-123953 | 5/1996 |
| JP | 11-055676 A | 2/1999 |

OTHER PUBLICATIONS

"Very large vocabulary isolated utterance recognition: a comparison between one pass and two pass strategies" Fissore et al, CSELT Torino, Italy. ICASSP 1998, IEEE pp. 203-206.*

* cited by examiner

*Primary Examiner* — Taghi Arani
*Assistant Examiner* — Jason Lee
(74) *Attorney, Agent, or Firm* — Canon U.S.A., Inc. IP Division

(57) ABSTRACT

A moving image coding apparatus includes a motion vector search unit configured to read coding target image data and reference image data which are stored in a memory, and search a motion vector. The motion vector search unit reads the coding target image data in multiple units of N horizontal pixels (N is an integer of 2 and more) and 1 vertical pixel and reads the reference image data in multiple units of P horizontal pixels (P is an integer of 2 and more) and Q vertical pixels (Q is an integer of 2 and more) from the memory.

5 Claims, 4 Drawing Sheets

MOVING IMAGE CODING APPARATUS

BACKGROUND OF THE INVENTION

1. Field of the Invention

The present invention relates to a moving image coding apparatus for compressing and coding moving image data.

2. Description of the Related Art

A camera-integrated moving image recording apparatus (i.e., a digital video camera) is well known for compressing and coding captured moving image data of an object and recording the compressed and coded moving image data on a recording medium. Recently, a disk medium or semiconductor memory which offers enhanced convenience as a recording medium (e.g., having a high random accessibility) is gradually replacing conventional magnetic tape media. However, such random access media generally have less recording capacity compared to that of the tape media, therefore, there is a need for highly efficient compression coding of the moving image data.

Furthermore, as public expectations grow for high image quality, a digital video camera that handles a high-definition (HD) video data containing a greater amount of information has been produced. Accordingly, highly efficient compression coding is required to compactly recording a high-quality moving image data.

As moving image compression method, the moving picture experts group (MPEG) methods (i.e., MPEG-2 and MPEG-4) have been developed, which are followed by development of H.264 standard having a higher compression rate. The H.264 standard requires a larger calculation amount in coding or decoding than the conventional coding methods such as MPEG-2 and MPEG-4, however, the H.264 standard can realize high coding efficiency.

One method to increase the coding efficiency in the H.264 standard is macro block partitions. This is a technique to finely divide a macro block (a coding block) which is a unit of the coding to form macro block partitions (motion compensation blocks) in order to perform motion compensation in a motion compensation block unit. In this way, more precise motion compensation can be achieved.

Against the backdrop as described above, a bus rate demanded to a frame memory which is provided in the moving image coding apparatus becomes extremely high due to an increase in the amount of information of the moving image for coding and segmentation of the motion compensation blocks. The frame memory refers to a memory for storing image data used particularly in coding.

Japanese Patent Application Laid-Open No. 8-123953 discusses a storing method of pixel data on the frame memory. More specifically, consecutive pieces of pixel data in one direction on a screen are stored as one word for one address of the frame memory. Further, consecutive addresses of the frame memory are arranged in a direction perpendicular to the above direction of the consecutive pieces of pixel data stored as one word. In a typical dynamic random access memory (DRAM), consecutive access without overhead is possible in a row address direction within a specific range. A high-speed memory access is realized by using this feature.

Recently, a bus width of the frame memory is being widened to increase a bus rate of the frame memory. When the motion compensation block is segmented, pixels stored on one address of the frame memory become more in number than horizontal pixels of the motion compensation block. Consequently, according to the method discussed in Japanese Patent Application Laid-Open No. 8-123953, a chance of accessing unnecessary pixel data is increased, and memory access efficiency is degraded.

SUMMARY OF THE INVENTION

The present invention is directed to a moving image coding apparatus for performing motion compensation which can smoothly perform a coding process by improving access efficiency to a frame memory, which stores image data to be coded and image data of a reference image used in the motion compensation.

According to an aspect of the present invention, a moving image coding apparatus that divides each picture of a moving image into blocks including a plurality of pixels, further divides the blocks into motion compensation blocks as a unit of motion compensation, acquires a motion vector using a past or future image as a reference image with respect to the motion compensation block of a coding target, and codes a difference between a prediction image based on the acquired motion vector and the motion compensation block of the coding target, includes a memory configured to store at least coding target image data and image data of the reference image, a first data writing unit configured to store the coding target image data in the memory, a second data writing unit configured to store the image data of the reference image in the memory, and a motion vector search unit configured to read the coding target image data and the image data of the reference image which are stored in the memory and search the motion vector, wherein the first data writing unit stores consecutive pieces of pixel data on the image in units of N horizontal pixels (N is an integer of 2 and more) and 1 vertical pixel in the memory for each address of the memory, the second data writing unit stores the consecutive pieces of the pixel data on the image in units of P horizontal pixels (P is an integer of 2 and more) and Q vertical pixels (Q is an integer of 2 and more) in the memory for each address of the memory, and the motion vector search unit reads the coding target image data in multiple units of N horizontal pixels and 1 vertical pixel and the image data of the reference image in multiple units of P horizontal pixels and Q vertical pixels from the memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Figure 1:
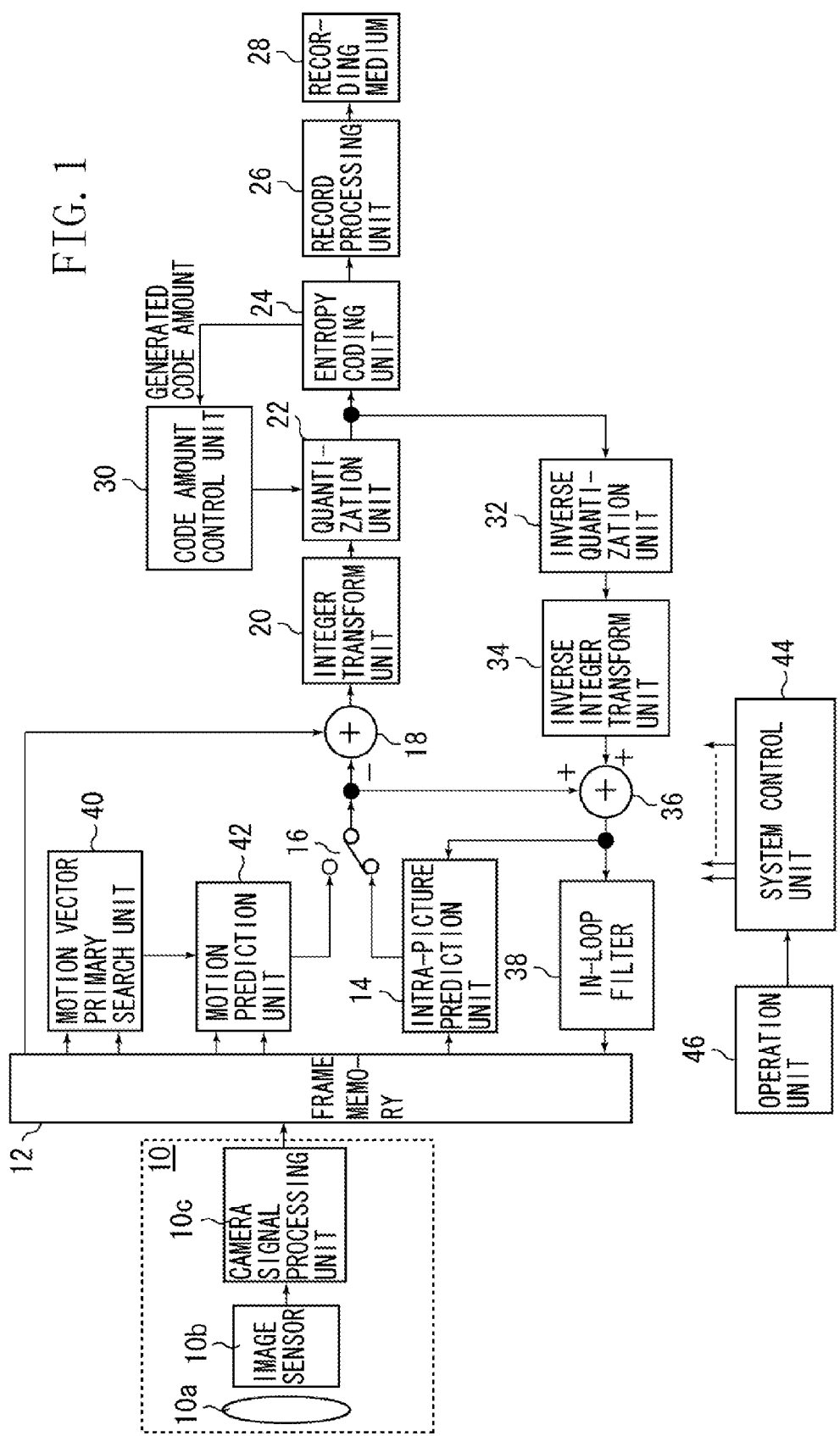
FIG. 1 is a block diagram illustrating an example of a configuration of a moving image coding apparatus according to an exemplary embodiment of the present invention.

FIG. 1 is a block diagram illustrating an example of a configuration of the moving image coding apparatus according to the exemplary embodiment of the present invention. In the moving image coding apparatus of the present exemplary embodiment, a coding block obtained by dividing each picture of a moving image is further divided into motion compensation blocks as a unit of motion compensation. For the motion compensation block to be coded, a motion vector is acquired by using a past or future image as a reference image, and a difference between a prediction image and the motion compensation block to be coded is coded based on the acquired motion vector. In such a configuration relating to compressing and coding processes, the present exemplary embodiment is characterized by a method for storing coding target image data and image data of the reference image on the frame memory and reading.

Referring to FIG. 1, an imaging unit 10 includes an imaging lens 10a, an image sensor 10b that converts an optical image of the imaging lens 10a to an image signal, and a camera signal processing unit 10c that converts an analog image signal output from the image sensor 10b to moving image data having a fixed format indicating the moving image. The moving image data output from the camera signal processing unit 10c of the imaging unit 10 is sequentially stored in a frame memory 12 in a unit of frames. The frame memory 12 is configured to store a plurality of frames. More specifically, the frame memory 12 stores a plurality of frames for coding target image data (current image data) and image data of the reference image used for the motion compensation.

A configuration of the frame memory 12 is described in detail. The frame memory 12 used in the present exemplary embodiment includes a four bank synchronous DRAM whose data bus has a 128-bit width. The 128-bit width of the data bus is equivalent to a use of two synchronous DRAMs having a 64-bit width connected by a same address line, for example. In a case of a double data rate (DDR) synchronous DRAM, a bit width can be considered as twice the actual bit width since data is accessed at a rising edge of an operation clock. Accordingly, when two 32-bit width DDR synchronous DRAMs are used, it can be considered as a 128 bit width.

In general, in the synchronous DRAM, a data storing area is specified by a row address and a column address. If the line address is the same, data in a plurality of column addresses can be accessed consecutively without overhead. An image signal is stored in the frame memory by a raster scan in a unit of fields which has a same format as a television signal. At this time, data including 16 pixels consecutively arranged in a horizontal direction of the image is allocated to one address of the synchronous DRAM as illustrated in FIG. 2, and a bank is switched for every 64 horizontal pixels and 32 vertical pixels for storing the data.

Figure 2:
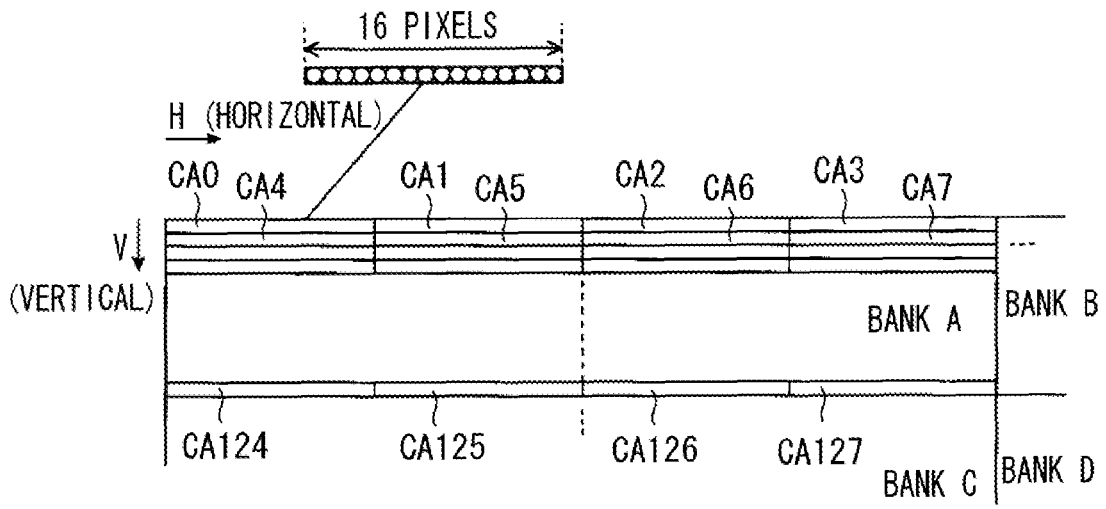
FIG. 2 is a diagram illustrating an example of a storing mode for writing image data to be coded to a frame memory.

The coding target image data which is output from the camera signal processing unit 10c is sequentially stored in the frame memory 12, as illustrated in an example of a storing mode in FIG. 2. The image data stored in the frame memory 12, for example, is read in an order of a coded frame, namely, a first frame, a second frame, a third frame, and so forth. Referring to FIG. 2, "CA" stands for a column address.

As coding methods of a moving image, there are an intra coding method for coding only with the image data included in the same frame and an inter coding method for coding by using an inter-frame prediction. In the inter coding, there is a predictive coded picture (P picture) which codes frame a unit of the motion compensation (the motion compensation block) by predicting from a single reference, and a bidirectionally predictive coded picture (B picture) which codes the motion compensation block by predicting from up to two reference frames. A picture on which the intra coding is performed is called an I picture. An input frame order differs from a coding frame order to enable backward prediction of a future frame.

Now, an intra coding operation is described. With respect to the I picture, an intra-picture prediction unit 14 sequentially reads the image data in the coding block which serves as a unit of coding from the frame memory 12. A size of the coding block is 16 horizontal pixels by 16 vertical pixels. The coding target image data is stored in the frame memory 12 by a data structure illustrated in FIG. 2. In other words, the camera signal processing unit 10c functions as a first data writing unit for writing pixel data by a raster mapping and stores a plurality of pieces of pixel data including consecutive N horizontal pixels (N is an integer of 2 and more, here, N=16) and one vertical pixel on a screen at one address of the frame memory 12. A horizontal pixel number of the coding block is N multiplied by 1, but it can be a multiple of N. In this case, the coding target image data is accessed in units of 16 pixels units in both the horizontal and vertical directions and the image data in one coding block is stored on a same bank and the same line address of the frame memory 12. Accordingly, the intra-picture prediction unit 14 does not need to read unnecessary data.

The intra-picture prediction unit 14 performs block matching of a plurality of pieces of prediction image data created from a local decode image of previously coded block with image data of a coding target block, among the coding target block and blocks within the same frame. The prediction image data having a highest correlation is selected as intra prediction image data and output to a switch 16. The switch 16 selects the output of the intra-picture prediction unit 14 for the intra coding, and the intra prediction image data is supplied to a subtracter 18. The image data of the coding target block is also supplied from the frame memory 12 to the subtracter 18. The subtracter 18 subtracts the image data of the intra prediction image received from the switch 16, from the image data of the coding target block received from the frame memory 12, and outputs a subtracted value for every pixel to an integer transform unit 20.

The integer transform unit 20 transforms subtraction information of the pixel values received from the subtracter 18. A quantization unit 22 quantizes transform coefficient data output from the integer transform unit 20. An entropy coding unit 24 performs entropy coding of the transform coefficient data which is quantized by the quantization unit 22. A record processing unit 26 processes and records the coded data from the entropy coding unit 24 on media 28 such as a disk and a memory.

The entropy coding unit 24 also outputs information about a generated code amount to a code amount control unit 30. The code amount control unit 30 controls a quantization step size in the quantization unit 22 so that a predetermined value of the code amount may be generated within a certain range such as one frame according to the generated code amount information from the entropy coding unit 24.

The output of the quantization unit 22 is also supplied to an inverse quantization unit 32 for a local decoding process. The inverse-quantization unit 32 inversely quantizes the output data of quantization unit 22. Further, an inverse-integer transform unit 34 transforms output data of the inverse-quantization unit 32. An adder 36 adds the prediction image data received from the switch 16 to the output data of the inverse-integer transform unit 34. Output image data of the adder 36 becomes a local decode image decoded within the moving image coding apparatus. Data of the local decode image output by the adder 36 is supplied to the intra-picture prediction unit 14 and used to generate the intra prediction image as described previously. Moreover, the output data of the adder 36 is also supplied to an in-loop filter 38. The in-loop filter 38 performs a reduction process of coding distortion included in the local decode image from the adder 36. Output image data of the in-loop filter 38 is stored in the frame memory 12 as reference image data that is used for inter coding for the motion compensation, which will be described below.

Figure 3:
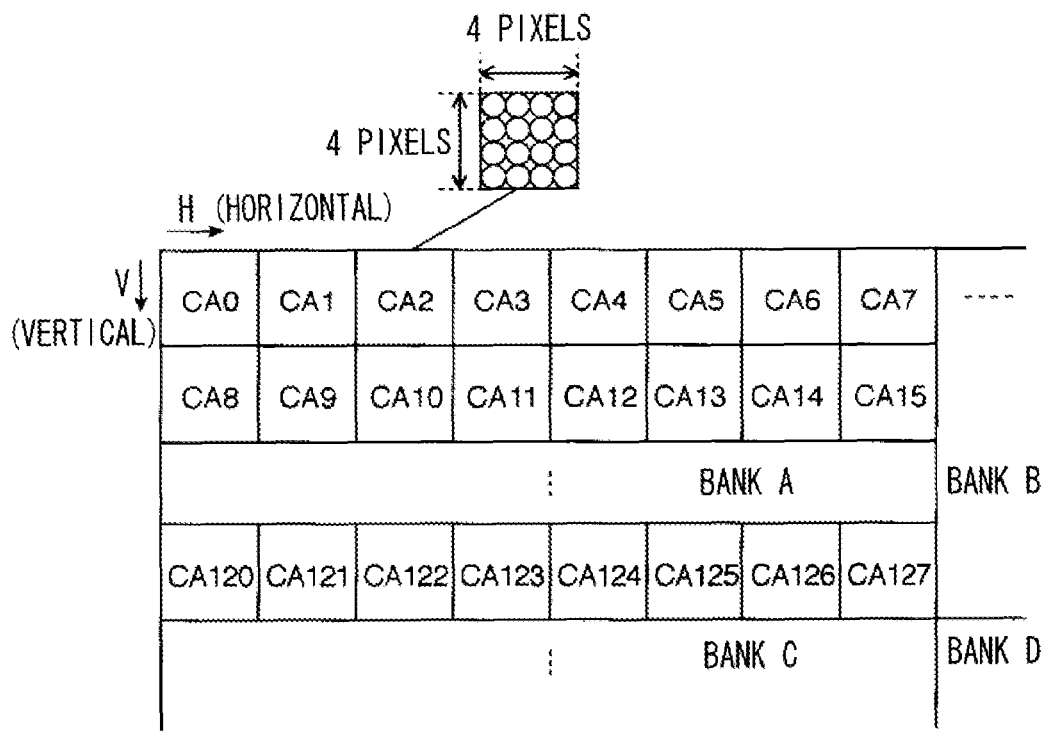
FIG. 3 is a diagram illustrating an example of a storing mode for writing reference image data to the frame memory.

When the reference image data output from the in-loop filter 38 is written to the frame memory 12, image data having 4 horizontal pixels by 4 vertical pixels consecutively arranged on the screen is stored at one address of the frame memory 12, and a bank is switched every 32 horizontal pixels by 64 vertical pixels. The in-loop filter 38 stores image data having P horizontal pixels (P is an integer of two and more, here, P=4), and Q vertical pixels (Q is an integer of two or more, here, Q=4) consecutively arranged on the screen at one address of the frame memory 12. That is, the in-loop filter 38 functions as a second data writing unit which writes the pixel data by block mapping. FIG. 3 illustrates an example of a storing mode when the reference image data is written to the frame memory 12. The data of the local decode image is the same size as a minimum motion compensation block size. Accordingly, the local decode image data is written to the frame memory 12 in units of 16 horizontal and vertical pixels and an unnecessary access is not performed.

Now, an inter coding operation is described. In the moving image coding apparatus of the present exemplary embodiment, a hierarchical search is employed which gradually improves pixel accuracy of a motion vector to be searched from a coarse search to desired pixel accuracy. A primary search and a detail search are performed as the hierarchical search. A motion vector primary search unit 40 conducts the coarse search (the primary search). Horizontal pixel accuracy of the search is a multiple of P or vertical pixel accuracy of the search is a multiple of Q. At least one of the two conditions is satisfied.

More specifically, the motion vector primary search unit 40 reads image data of the coding target block which is previously reduced, namely, image data whose pixels are thinned out from the frame memory 12 line by line and stores the image data in an inner local memory. A reduction rate of the image is assumed to be ¼ in the horizontal direction and ¼ in the vertical direction. Therefore, the reduced image has 4 horizontal pixels by 4 vertical pixels as a coding block size. The reduction process is executed, for example, at the same time as the camera signal processing unit 10c writes output image data to the frame memory 12. Alternatively, the motion vector primary search unit 40 may read the image data of the coding target block from the frame memory 12, reduce the image data, and store the reduced data in the inner local memory.

The motion vector primary search unit 40 also reads reduced image data of the reference image which is a motion vector search range from the frame memory 12 in a unit of the block and stores the reduced image data in the inner local memory. A search range is set to ±8 pixels in both of the horizontal and vertical directions of the reduced image centering on a position of the coding target block. Hence, the search range, as illustrated in FIG. 4, becomes a rectangular shape having 20 pixels on both horizontal and vertical sides.

Figure 4:
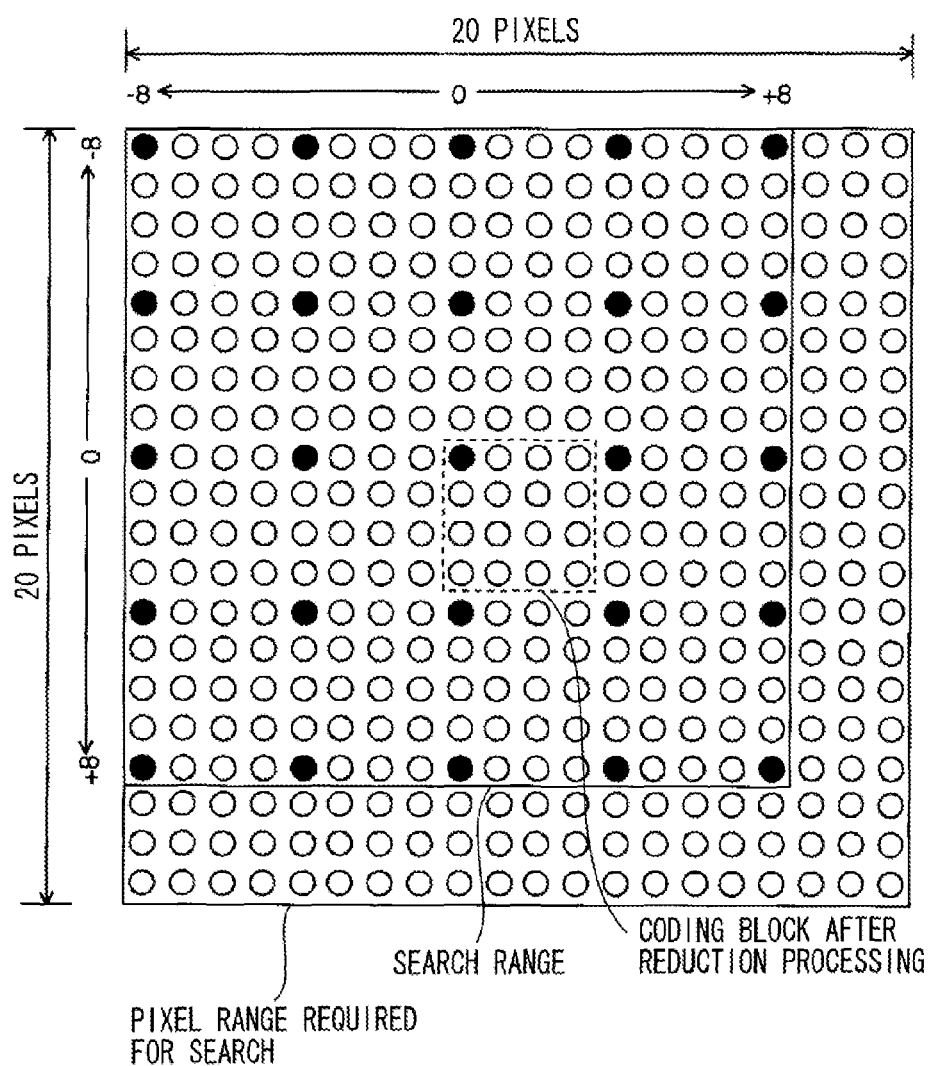
FIG. 4 is a diagram for describing a search range of a primary search of a motion vector.

FIG. 4 describes the search range of the primary search of the motion vector. Black spots illustrated in FIG. 4 indicate coordinates multiplied by 4 on both horizontal and vertical sides, that is, the spot shows a pixel having a horizontal starting coordinate and a vertical starting coordinate.

Regarding the reduced image data of the reference image which is the motion vector search range, when the in-loop filter 38 writes the reference image data to the frame memory 12, the reference image data on which the reduction process is performed may be written to the frame memory 12 at the same time. The reduced image data of the reference image is stored in the frame memory 12 in the storing mode illustrated in FIG. 3. A rectangle area of the reference image data of FIG. 4 can be read without making a useless access.

The motion vector primary search unit 40 searches for a block having a high correlation with the coding target block from the image data within the search range stored in the internal local memory, determines a primary motion vector, and supplies information about the primary motion vector to a motion prediction unit 42.

The motion prediction unit 42 searches the motion vector in detail by centering on the primary motion vector determined by the motion vector primary search unit 40. First, the motion prediction unit 42 reads the image data of the coding target block from the frame memory 12 line by line and stores the read data in the internal local memory. A size of the coding block is 16 horizontal pixels by 16 vertical pixels. The image data is stored in the frame memory 12 illustrated in FIG. 2, such that the image data can be read without the overhead.

Figure 5:
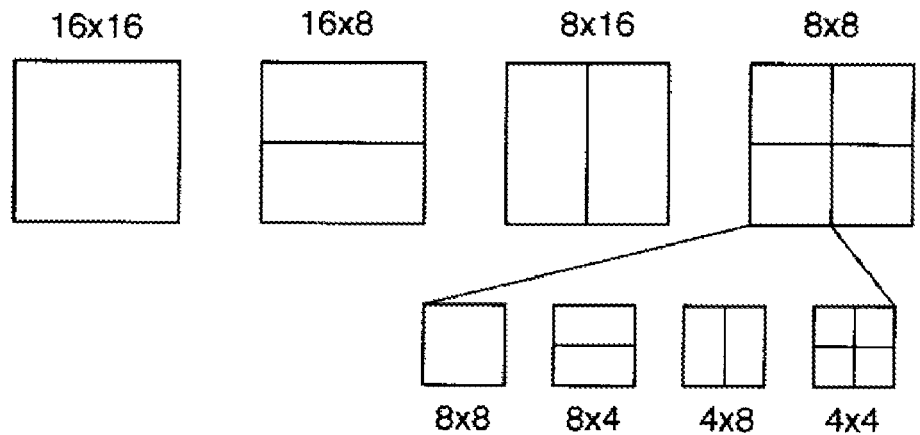
FIG. 5 is a diagram illustrating exemplary sizes of motion compensation blocks used in the moving image coding apparatus.
Figure 6:
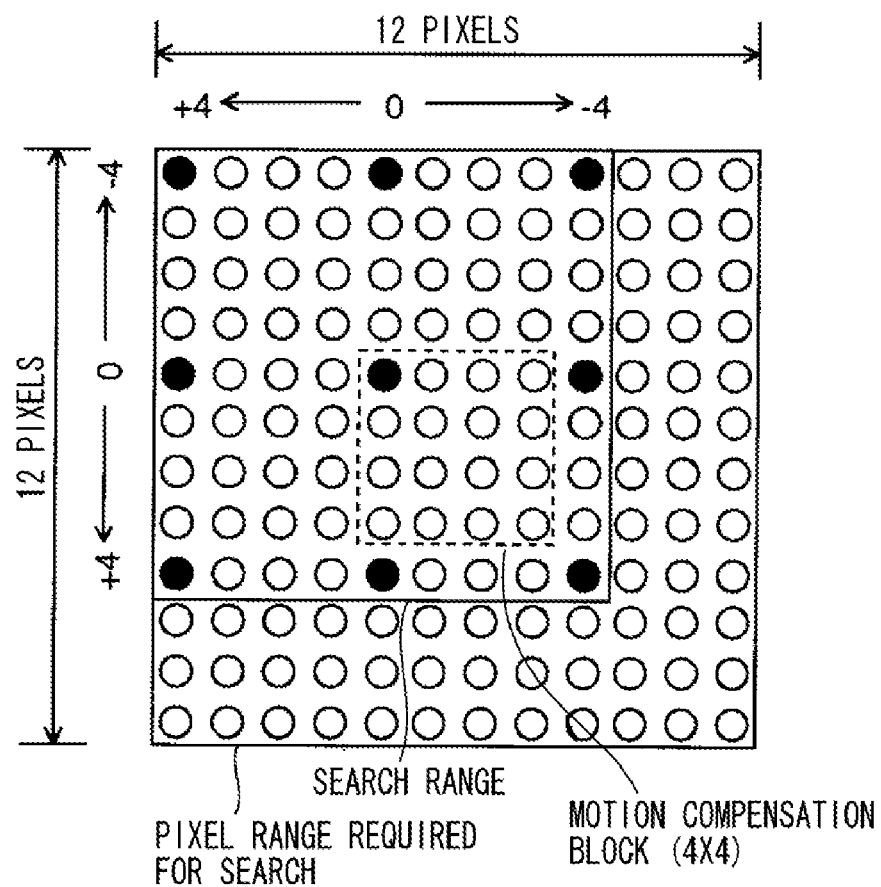
FIG. 6 is a diagram for describing a search range of a detail search of the motion vector.

The motion prediction unit 42 searches the motion vector for every motion compensation blocks. FIG. 5 illustrates an example of sizes of the motion compensation blocks used in the moving image coding apparatus of the present exemplary embodiment. There are a plurality of kinds of the motion compensation blocks that can be selected for every coding target block, as illustrated in FIG. 5. The size of the motion compensation block is a multiple of P for the horizontal pixels and a multiple of Q for the vertical pixels, relative to a size of the reference image (P horizontal pixels and Q vertical pixels), in general. As an example, a 4×4 block is described. Normally, as a block becomes smaller, access efficiency to the frame memory 12 tends to fall. FIG. 6 describes the search range of the detail search of the motion vector. When the motion vector is searched in the search range of 4 pixels of both the horizontal and vertical sides, as can be seen from FIG. 6, the necessary reference image data is within the range of 12 horizontal pixels and 12 vertical pixels.

The primary motion vector can be an optional value. However, the primary motion vector is determined using the reduced image data. Since both the horizontal and vertical reduction rates of the reduced image are ¼, horizontal and vertical values of the primary motion vector need to be multiplied by 4 in order to convert the image to coordinates of the original image before reduction. Therefore, a rectangular area of the reference image data necessary for the detail search, as illustrated in FIG. 6, horizontal coordinates and vertical coordinates on upper left of the rectangle become multiples of 4. In FIG. 6, black spots indicate coordinates of the multiples of 4 on both horizontal and vertical sides, that is, the spot indicates a pixel having a horizontal starting coordinate and a vertical starting coordinate. As described above, a size of the rectangle is a multiple of 4 in both the horizontal pixels and vertical pixels.

The reference image data is stored in the frame memory 12 as illustrated in FIG. 3. Thus, the motion prediction unit 42 can consecutively read the reference image data from the frame memory 12 without the overhead. The motion prediction unit 42 reads the reference image data in the search range from the frame memory 12 and stores the read data in the internal local memory. Further, the motion prediction unit 42 searches for the block having a high correlation with the motion compensation block from the coding target blocks stored in the internal local memory. The detail search of the motion vector described above is repeated by a number of the motion compensation blocks, and the motion prediction image data for each coding target block is output to the switch 16.

In a case of the inter coding, the switch 16 is switched to an output side (inter prediction image side) of the motion prediction unit 42. The subtracter 18 calculates a difference between the image data and the prediction image data of the coding target, namely, difference image data. Detailed description of subsequent operations of the inter coding is omitted, since it is similar to that of the intra coding.

A system control unit 44 controls operations of various units according to an operation mode and user operations of an operation unit 46.

According to the configuration described above, the moving image coding apparatus for performing the motion compensation can improve the access efficiency to the frame memory 12 which stores the image data of the coding target and the image data of the reference image used for the motion compensation. Therefore, the moving image coding apparatus can perform a smooth coding process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-238713 filed Sep. 14, 2007, which is hereby incorporated by reference herein in its entirety.

What is claimed is:

1. A moving image coding apparatus comprising:
   a memory that stores at least image data of a coding target image and image data of a reference image with respect to a motion compensation block of the coding target image;
   a first data writing unit that stores the image data of the coding target image in the memory;
   a second data writing unit that stores the image data of the reference image in the memory; and
   a motion vector search unit that reads the image data of the coding target image and the image data of the reference image which are stored in the memory, and determines a motion vector that uses a past or future image as the reference image,
   wherein the memory has a plurality of data storing areas, the data storing areas are specified by a row address and a column address,
   wherein the first data writing unit stores consecutive pieces of pixel data on the coding target image in units of N horizontal pixels (N is an integer of 2 and more) and 1 vertical pixel in the memory for each data storing area of the memory,
   wherein the second data writing unit stores the consecutive pieces of the pixel data on the reference image in units of P horizontal pixels (P is an integer of 2 and more) and Q vertical pixels (Q is an integer of 2 and more) in the memory for each data storing area of the memory,
   wherein the motion vector search unit reads the image data of the coding target image in multiple units of N horizontal pixels and 1 vertical pixel and the image data of the reference image in multiple units of P horizontal pixels and Q vertical pixels from the memory, and
   wherein the motion vector search unit performs a coarse motion vector search of coarse pixel accuracy and a detail motion vector search with increased pixel accuracy.

2. The moving image coding apparatus according to claim 1, wherein the motion vector search unit reads reduced data of the coding target image in the multiple units of N horizontal pixels, 1 vertical pixel and reduced data of the image data of the reference image in the multiple units of P horizontal pixels and Q vertical pixels from the memory.

3. The moving image coding apparatus according to claim 1, wherein the second data writing unit sets a pixel block including P horizontal pixels and Q vertical pixels to be same size as a selectable minimum motion compensation block.

4. The moving image coding apparatus according to claim 1, wherein the integers N is 16 and, P and Q are 4, respectively.

5. The moving image coding apparatus according to claim 1, wherein the motion vector search unit searches a block having a high correlation with the coding target image.

* * * * *